US010764228B1

(12) United States Patent
Donohue et al.

(10) Patent No.: US 10,764,228 B1
(45) Date of Patent: *Sep. 1, 2020

(54) AUTOMATED MESSAGE RECALL FROM A SENDER'S DEVICE

(71) Applicant: WhatsApp Inc., Menlo Park, CA (US)

(72) Inventors: Michael B. Donohue, Mountain View, CA (US); Erik James Reed, Dublin, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,387

(22) Filed: Feb. 28, 2019

Related U.S. Application Data

(63) Continuation of application No. 15/291,027, filed on Oct. 11, 2016, now Pat. No. 10,263,937, which is a continuation of application No. 14/170,345, filed on Jan. 31, 2014, now Pat. No. 9,503,401.

(51) Int. Cl.
*G06F 15/16* (2006.01)
*H04L 12/58* (2006.01)
*H04L 29/08* (2006.01)

(52) U.S. Cl.
CPC ............ *H04L 51/30* (2013.01); *H04L 51/043* (2013.01); *H04L 51/10* (2013.01); *H04L 67/02* (2013.01)

(58) Field of Classification Search
CPC ...................................................... H04L 51/30
See application file for complete search history.

(56) References Cited

U.S. PATENT DOCUMENTS

| | | | |
|---|---|---|---|
| 2008/0039058 A1* | 2/2008 | Ray | H04W 28/14 455/414.3 |
| 2009/0176517 A1* | 7/2009 | Christie | H04M 1/72552 455/466 |
| 2010/0211599 A1* | 8/2010 | Cao | H04L 67/2861 707/769 |
| 2012/0311096 A1* | 12/2012 | Hurley | H04L 67/06 709/219 |
| 2014/0108575 A1* | 4/2014 | Yao | H04L 51/046 709/206 |

* cited by examiner

*Primary Examiner* — Kevin T Bates
*Assistant Examiner* — Clarence D McCray (57) ABSTRACT

A system, apparatus, and methods are provided for supporting automated recall of a message (e.g., a chat message) from an originator's device, or at least media that accompanied the message. An original message may convey one or more media files that are temporarily stored on a system or apparatus that hosts the communication application used to create, send, and receive messages. The media files may be lost in transit because of failure of a system component, failure of a storage device, purging of the files before they are retrieved by a recipient, or for some other reason. When the recipient's device receives an error in response to an attempt to retrieve the media file(s), it automatically initiates a recall request that is returned to the originating device. If the message and media are still available on the device, an abbreviated version of the message is re-sent, with the media.

20 Claims, 3 Drawing Sheets

AUTOMATED MESSAGE RECALL FROM A SENDER'S DEVICE

CROSS-REFERENCE TO RELATED APPLICATION

This application is a continuation of, claims the benefit of and priority to previously filed U.S. patent application Ser. No. 15/291,027 filed Oct. 11, 2016, entitled "AUTOMATED MESSAGE RECALL FROM A SENDER'S DEVICE," which is a continuation of, claims the benefit of and priority to previously filed U.S. patent application Ser. No. 14/170,345 filed Jan. 31, 2014, entitled "AUTOMATED MESSAGE RECALL FROM A SENDER'S DEVICE", which are hereby incorporated by reference in their entireties.

BACKGROUND

This invention relates to the field of electronic communications. More particularly, a system, apparatus, and methods are provided for automatically recalling or retrieving a past message from the device used to send the message.

Users of mobile computing and communication devices rely on those devices to exchange many types of messages with users of other devices. A significant percentage of those messages convey some type of media, such as a photograph, a video clip, and/or an audio recording. Depending on the application or utility logic used to transport the message to its recipient(s), a copy of some of the message (e.g., just the media content, the media content and any accompanying textual message) may be stored permanently or for a relatively long period of time by some intermediate entity (e.g., a communication service provider, a provider of the application logic).

Some communication service providers and application providers, however, do not retain messages or their media permanently or semi-permanently. To do so would require an enormous investment in electronic storage. Archiving, backing-up, and/or providing redundant backup (e.g., with a Redundant Array of Independent Disks or RAID) would add even more expense.

An application provider or service provider that does not provide unlimited and/or fault-tolerant data storage may therefore be unable to deliver a message, or media content it conveys, in the case of a device failure, if the message or its media was discarded before it could be delivered to a recipient, or if some other error occurs.

SUMMARY

In some embodiments of the invention, a system, apparatus and methods are provided for automatically recalling a message, or at least the media it contained, if the media could not be delivered.

In these embodiments, when a recipient's device discovers that media that had been dispatched for a user of the device cannot be received or retrieved normally (e.g., from an application service provider), it automatically initiates a message recall via the application logic used to send and convey the message. The recall request is directed to the sender's device and, if the original message (which may be identified by a message key) is still available, that device automatically re-sends the message. This may be done without action or interaction by or with the sender or the recipient of the message.

In some embodiments, an automatic recall of media that accompanied a group message (i.e., a message addressed to multiple recipients) may be directed to one or more of the original recipients, instead of or in addition to the sender of the message.

DETAILED DESCRIPTION

The following description is presented to enable any person skilled in the art to make and use embodiments described herein. Various modifications to the disclosed embodiments will be readily apparent to those skilled in the art, and the general principles defined herein may be applied to other embodiments and applications without departing from the scope of the present disclosure.

In some embodiments, a system, apparatus, and methods are provided for automatically recalling a message, or attempting to recall the message, when media that it conveys (e.g., an image, a video clip) cannot be delivered to a recipient by a service provider. Illustratively, delivery of the media may have failed or become impossible because a storage device or server failed, because a default period of retention of the media (or the message) expired before the recipient attempted to retrieve the media or before the recipient's device came online and could receive the message. In other embodiments, automatic recall of a message may be initiated when delivery of media fails for some other reason.

In these embodiments, the recipient's device (a smart phone, a personal digital assistant, a portable computing device) receives an error when the media (or the message transporting the media) cannot be delivered. This error informs application logic operating on the device (e.g., an application used to generate, send, and receive messages) that a problem exists or has occurred external to the device.

Embodiments described herein are implemented within a communication environment in which text, images, video, voice recordings, and/or other electronic information are exchanged via data communication channels conforming to an IEEE 802.11 standard (e.g., Wi-Fi® connections). For example, the application may be the WhatsApp® Messenger application provided by WhatsApp Inc. In these embodiments, rather than relying upon traditional wireless voice communication channels that provide limited support for transmission of instant or real-time communications other than live voice conversations, the data communication channels allow unconstrained exchange of virtually all types of communications and media between devices of the same and/or different types.

Illustrative embodiments are described as they may be implemented as part of a one-on-one communication session (e.g., a chat session), but are also applicable to group communication sessions (e.g., a group chat session).

Figure 1:
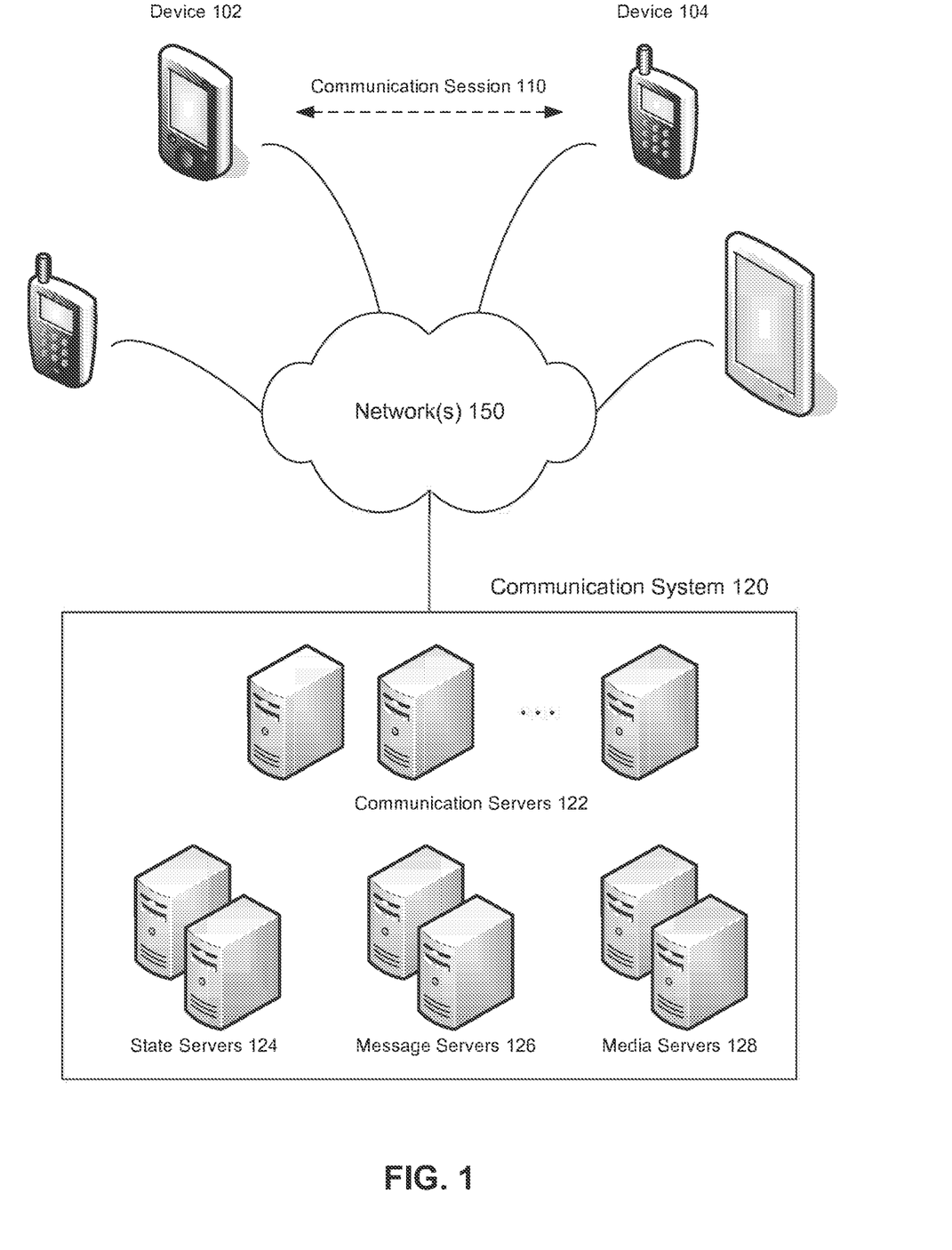
FIG. 1 is a block diagram depicting a communication environment in which some embodiments of the invention may be implemented.

FIG. 1 is a block diagram of a system for facilitating automated recall of messages from senders' devices, according to some embodiments.

In these embodiments, users of communication system 120 operate a variety of portable communication devices operating the same or different operating systems (e.g., Android, iOS, Symbian, Windows Phone). Thus, devices 102, 104 are operated by different users, and may be configured similarly or very differently in terms of functionality, applications, utilities, etc. Each of them, however, executes a version of a common communication application hosted by communication system 120. Illustrative communication session 110 between devices 102, 104 comprises separate connections between device 102 and system 120 and between device 104 and system 120.

System 120 is a data center, computer network, or other cooperative collection of computer resources for hosting a communication application or service that can be simultaneously used by multiple users (or at least for hosting a server portion of such a communication application). In some implementations, the application provides a user with instant messaging of text, audio recordings, photos, video, and multimedia from his or her communication device (e.g., device 102), to/from one or more other users operating other communication devices (e.g., device 104).

The communication application hosted by system 120 is compatible with devices 102, 104 and includes client logic executed under the devices' native operating systems. A user operating one type of device and subscribing to one communication server provider can exchange messages with users operating other types of devices and subscribing to other communication service providers. Individual messages may be sent to any number of recipients; for example, a group form of communication (e.g., chat) may be offered in which multiple users interactively exchange instant communications.

Communication servers 122 are front-end components of system 120 that host users' connections with the system and that facilitate the exchange of communications between users. Servers 122 may be referred to as "chat" servers, in that they receive real-time messages and chat session communications from individual users for delivery to one or more other users. Although messages handled by communication servers 122 may be termed "chat" messages, they are not limited to textual content and may instead (or also) contain embedded, attached, or associated (e.g., linked) media content.

Illustratively, as long as a user is on-line with system 120 and the application is executing on his or her device, a connection or session may be maintained between the device and a communication server 122. When the user closes the application on the device, his or her connection may persist for some period of time (e.g., five minutes, fifteen minutes).

State servers 124 maintain states or statuses of users and/or users' devices. Thus, a state server stores some or all of a user's profile, including applicable preferences (e.g., preferred audible and/or visual alert, status message), device type/model, etc. Some status information maintained by a state server with regard to a user may persist only for the duration of the user's current connection with system 120. As the user's device operates in different ways or different modes, goes offline, comes online, and so on, a state server may or may not capture or retain those changes.

In some embodiments, as part of a user profile retained on a state server, identities of other users associated with that user may be determined. These other users may be informed of some or all changes in the user's status (or the changes in the status of the user's device)—such as when she comes online and when she goes offline.

Message servers 126 store communications that cannot immediately be delivered to their target or destination users. A new message (e.g., a chat message) received for a user who is currently on-line with system 120 can be delivered immediately (i.e., through the user's open connection with a communication server 122). However, a message received for a user who is currently off-line (i.e., does not have an open connection with a communication server 122), or at least a textual portion of such a message, may be stored on a message server 126 until it can be delivered.

Media servers 128 store media files or content that await delivery to a destination user, other than messages stored on message servers 126. For example, a chat message from one user to another may comprise or be accompanied by a photo, a video clip, an audio recording, or some other media. The media is stored on a media server 128 until it can be delivered, which may be done automatically when the destination user is online, or which may be initiated only when the destination user requests the media (e.g., by clicking on a link in the chat message when the chat message is delivered to the destination user).

Information identifying termination points of online users' connections with system 120 may be stored on communication/chat servers 122, state servers 124, and/or other entities (e.g., a session server (not depicted in FIG. 1)). For example, each communication server may maintain a table or other data structure identifying users whose connections with the system are terminated at or hosted by that server. Another entity (e.g., a state server 124, a session server) may store a larger dataset that identifies, for every user connected to the system, which communication server maintains their connection.

Thus, when a communication server receives a new communication from a connected user, it may perform a lookup within local data and/or data stored on another system entity in order to determine the other user's status (e.g., whether he is connected, whether he is busy communicating) and, if so, where. In some implementations, it will first search a local data table (e.g., a routing table), and only issue a query to another component if the destination user's status is not found locally.

Any number (e.g., one or more) of communication servers, state servers, message servers, media servers, and/or other servers may be deployed within system 120. The functions of servers 122, 124, 126, 128 may be distributed differently in other embodiments, such as by being merged into fewer servers or divided among additional servers.

The servers of system 120 may be separate physical computer systems comprising distinct hardware resources (e.g., processor, storage, communication interface) and software resources (e.g., program code, data) suitable for performing the functions ascribed to them. In some alternative embodiments, any or all of the servers may be virtual computing machines that share hardware and/or software resources. Thus, multiple software server modules performing different functions may reside on one server computer.

Network(s) 150 comprise communication paths between users' devices and system 120, and may include data and/or voice communication channels. For carrying data communications, networks 150 may comprise the Internet, one or more intranets, LANs (Local Area Networks), WANs (Wide Area Networks), and/or other point-to-point or distributed connections, which may be wired and/or wireless in nature. For carrying voice communications, network(s) 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO), and so on.

Networks 150 may thus comprise various entities not shown in FIG. 1, such as routers, gateways, switches, base stations (e.g., wireless access points, Node Bs, Evolved Node Bs), and/or other equipment for establishing, maintaining, switching, or otherwise manipulating a data and/or voice connection.

Figure 2:
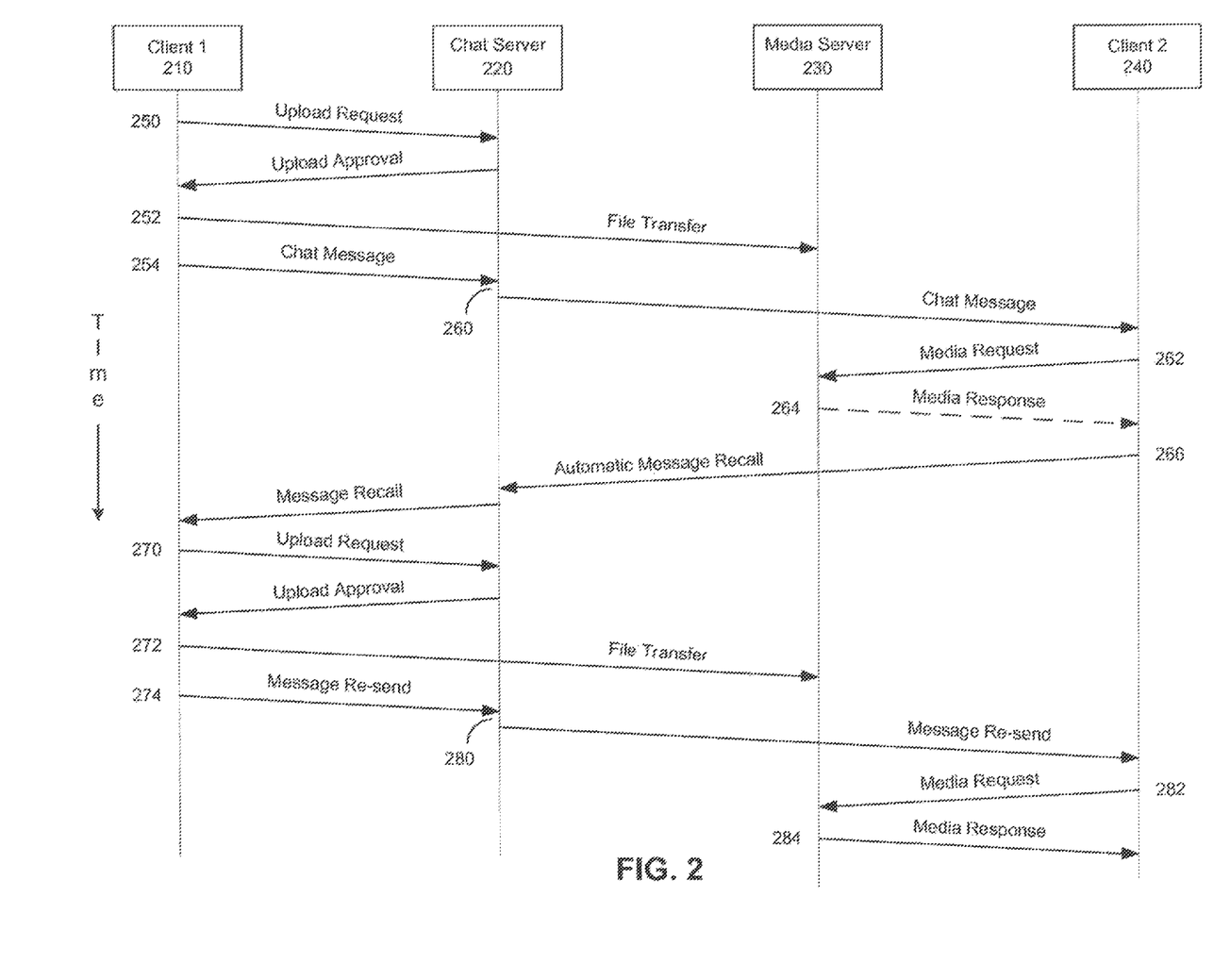
FIG. 2 is a time sequence diagram illustrating a method of automatically recalling a media message, in accordance with some embodiments of the invention.

FIG. 2 is a time sequence diagram illustrating a method of automatically recalling a message from a sender's device, according to some embodiments.

In these embodiments, a first user of a first client device 210 (e.g., a smart phone, a portable computing device) sends a chat message or other message that includes or is accompanied by media content (e.g., a file containing an image, a video clip, or an audio recording). As described above, the media cannot initially be delivered to a second user of a second client device 240 for some reason, and so device 240 (or some component of the system that provides or supports the users' messages) will initiate an automatic recall of the original message (and media content) from device 210.

Also, in these embodiments, chat server 220 and media server 230 may correspond to communication servers 122 and media server 128 of communication system 120 of FIG. 1. As described previously, any of multiple types of communication channels and/or networks may be employed to convey the various communications depicted in FIG. 2.

In methods corresponding to FIG. 2, at time 250 the user of client device 210 composes or dispatches a chat message to the user of client device 240, using a communication application supported by servers 220, 230. The user identified one or more media files to accompany the message.

In response to the first user's action, device 210 requests approval or permission from chat server 220 to upload the media content. Illustratively, the device already is connected to server 220, especially if the device recently sent or received another chat message. The 'upload request' communication from device 210 to chat server 220 may include information such as the type of content (e.g., image, video, audio), the name of the file or files comprising the content, the size of the file or files, and/or other information (e.g., a file format, an image or video resolution, an audio sampling rate).

The chat server responds with an 'upload approval' message if the media identified in the 'upload request' communication is not already stored on the system and if there is no other reason to delay or reject the device's request. The upload approval communication (or some other notification to device 210) provides a new URL (Uniform Resource Locator), file handle, or other identifier by which the media content will be known within the system comprising servers 220, 230. The upload approval communication may also identify where the media should be sent (e.g., an address and port number of media server 230) and/or other information. If the media was already stored within the system, client 1 device 210 would be notified and would be provided with an existing URL of the media.

In some embodiments, the upload request dispatched by device 210 includes a set of hashcodes for identifying the media, which may be generated by hashing the media on the device. In these embodiments, each hashcode generated on device 210 is derived from and represents a separate media file stored on device 210. In some alternative embodiments, device 210 may include in the upload request a hashcode copied from a media message it received from another user (and which uniquely identifies media that accompanied that message). Because this hashcode can identify the media within the communication system, assuming it has not yet been purged, it need not be generated anew at device 210.

Within the communication system, a hashcode is mapped to a storage location of the corresponding media (e.g., on a media server) if it has already been stored. In some implementations, a hashcode mapping may include other information (e.g., an identifier of the device or user from which the corresponding media was originally received). When chat server 220 receives a hashcode in an upload request communication, it determines whether the media corresponding to the hashcode is already stored (e.g., by querying an index or a media server), and responds with a media upload approval communication and the new URL if it is not already stored. If the media is already stored, the device receives the existing URL of the media instead.

At time 252, device 210 uploads the media content file(s) to media server 230, as specified in the 'upload approval' communication. The process of FIG. 2 may wait until this file transfer is successfully completed, or the device may continue with the next operation before the upload has completed. As the content is uploaded, or after it is uploaded, it may be transcoded to change an image resolution, an audio sampling rate, a video resolution, and/or other characteristics of the media.

At time 254, device 210 dispatches the first user's chat message to chat server 220. Illustratively, the chat message includes some textual content composed by the first user (e.g., to identify the media, to explain why he or she is sending it), a thumbnail of the media (if the media includes an image or video), a timestamp identifying when it was sent, a message key uniquely identifying the message, the URL(s) or other identifier(s) of the media on server 230, a hashcode corresponding to the media, and/or other components. Notably, however, the media content has been (or is being) uploaded separately; therefore, that content is not included within the chat message transmitted at time 254.

At time 260, the first user's chat message resides at chat server 220 and the accompanying media has been stored on media server 230. In some implementations, the media upload may still be in process, depending on the size of the media file(s), the bandwidth available to device 210, and/or other factors.

Sometime after the first user's chat message is received, chat server 220 forwards it toward device 240. If device 240 is online (e.g., connected to a chat server) when the chat message is received at chat server 220, the chat message may be delivered immediately. If the device is offline, it may be delivered automatically the next time it connects to a chat server. Again, the chat message forwarded toward the second user does not contain the media, but does include information that device 240 can use to request the media from media server 230 (e.g., an assigned URL), and has the same message key or message identifier by which the message is known at client 210.

After receiving the chat message, at time 262 device 240 issues a 'media request' communication to media server 230 (which may be identified in the chat message received by the device), and provides the media identification information received with the chat message. In response, at time 264 the media server will ordinarily retrieve and send the media to device 240.

However, as indicated by the dashed line associated with the 'media response' message, for some reason the media server cannot deliver the media. In embodiments reflected in FIG. 2, the problem lies within the communication system encompassing media server 230 and/or chat server 220, and not with client device 240.

For example, if device 240 was not brought online with a chat server for an extended period of time, by the time it does come online, receives the first user's chat message, and can request the media, the media may have already been purged from media server 230. Or, after receiving the chat message, the user may not initiate the media request for an extended period of time (e.g., the second user may have forgotten about the media or may not have been interested in it at that time). Specifically, in the illustrated embodiments, media content being conveyed from one client device to another is retained temporarily (e.g., fifteen days, thirty days, forty-five days), and is deleted after that temporary period.

In some embodiments, a user (e.g., the user of device 240) may configure her device (or the communication application) to automatically download media sent toward her and identified in a chat message received at her device. In this case, as long as her device is brought online within the temporary period following time 260, the media will not yet have been purged. Alternatively, the user may configure her device or the application to require her manual direction to download media. In this case, her device must be brought online and she must initiate the download within the temporary period following time 260.

As another example, media server 230 may experience a failure of a storage device or other component, and the media content may be lost. In these embodiments, media server 230 does not provide redundant or fault-tolerant storage. Thus, if the storage device(s) on which the media is stored fails, the media will be lost.

Because the specified media cannot be delivered, in the method of FIG. 2, at time 264, media server 230 returns an appropriate error message that informs device 240 that the media cannot be delivered, but that the reason for the failure is external to the device. In some implementations, an HTTP (HyperText Transport Protocol) message such as HTTP Error 404, HTTP Error 410, or HTTP Error 503 is reported to client device 240.

In response to the error message, device 240 issues an automatic message recall at time 266, toward chat server 220 (i.e., the chat server that sent the chat message associated with the lost media) or some other chat server. The chat server receives the recall message and forwards or dispatches it to client device 210. The 'message recall' communications include at least the message key and any other information necessary for identifying the message associated with the lost media (and/or the media itself).

The client device receives the 'message recall' communication, extracts the message key, and determines whether the message and the associated media are still available. If the message or the media has already been deleted, the process may terminate with or without any response to client device 240. In some implementations, however, device 240 will receive a communication (via chat server 220) indicating that the requested message could not be recalled. In this case, the device may notify the second user that the media associated with the received chat message cannot be retrieved.

Assuming the message and media are still available on the first user's device, at time 270 device 210 restarts the message transmission process by issuing a new 'upload request' communication, and the chat server responds with another 'upload approval' communication. Device 210 will be provided the new URL or identifier of the re-uploaded media, as part of the upload approval communication or some other communication.

The media content is then re-uploaded starting at time 272. At time 274, an abbreviated version of the chat message is sent by device 210 to chat server 220. The abbreviated re-sent message has the same message key as the original chat message, and the (new) URL or other content identifier for identifying the media within the media server, but may omit the textual content, thumbnail, and/or other elements. It will also have a new timestamp, and may be marked or labeled to indicate that it is a re-sent version of a previous chat message.

At time 280, the chat server forwards the abbreviated re-sent chat message toward client device 240 if and when the device is online. Because it just recently issued the automatic message recall, that client device likely is still online.

At time 282, client device 240 extracts the necessary identifier (e.g., URL) of the media from the re-sent chat message and sends a new 'media request' communication to media server 230. At time 284, the media server identifies and retrieves the media, and returns it to the client device, where it can now be presented to the second user.

When device 240 receives the re-sent chat message, with the same message key as the original chat message, it may execute duplication logic to resolve the apparent conflict. However, the re-sent message has a newer timestamp, and may identify the nature of the message. Therefore, device 240 can readily determine that the URL received with the re-sent message is intended to replace the lost media associated with the original message. It may therefore discard the original message.

When the media for a recalled message is received at a destination device (e.g., with the 'media response' communication issued at time 284 in FIG. 2), the destination device may merge the media with the original chat message (or merge the original chat message with the re-sent media), so that the recalled message can be presented to the user of the device the same (or almost the same) as it would have appeared if the original message was delivered without any problem. The time of the message, as shown to the user, may reflect the timestamp of the original message or of the recalled message.

Some communications depicted in FIG. 2 may be delivered reliably, while others may not. In particular, both the original chat message and the re-sent chat message may be positively delivered, meaning that chat server 220 and the client devices will verify proper transmission and receipt of the messages. The media associated with the chat messages, and the control messages (e.g., upload request, upload approval, media request, media response), are dispatched without assurance or verification of delivery.

Therefore, out-of-order delivery of communications is possible, but client devices (e.g., client application logic operating on the devices) are configured to examine message keys, compare timestamps, identify different types of messages, and so on, in order to properly handle original messages, re-sent messages, etc.

Either, neither, or both users of devices 210, 240 may be advised of the automatic message recall attempt and/or success. If the original message was a group chat message (i.e., a message dispatched to multiple destination users), it may be automatically re-sent to all recipients or just the user of device 240. Illustratively, it may be re-sent to all recipients if the reason for the failure of delivery of the original transmission was of one type (e.g., failure of a server component) or the associated error was of one type (e.g., HTTP Error 410), in which case multiple or all recipients may have been affected. It may be sent only to the user of device 240 if the failure of delivery of the original transmission was of a different type (e.g., the media had been purged before the second user requested it) or the associated error was of another type (e.g., HTTP Error 404).

Also, in the group chat message scenario, the automatic message recall may be directed to another recipient of the original message, instead of (or in addition to) the originator. This may be done, for example, if the originator is not currently online but one or more recipients of the message are. The message recall may be sent one-by-one to the online recipients, until one responds with a re-send of the message and media, or may be sent to multiple of the original recipients in parallel. The originator and original recipients to whom an automated message recall is sent may or may not respond negatively if they cannot re-send the message or the media.

In different embodiments, an originating device (such as device 210 of FIG. 2) may process a message recall communication differently. For example, in some embodiments a message recall provides the message key or identifier of the original message, but no separate identifier of the media file(s) that accompanied the message. In these embodiments, the originating device cannot re-send the message (and media) unless it still has the original message.

In other embodiments, an identifier of a media file on the originating device is stored in the original message, and returned with an automated message recall, with or in place of the message key. In these embodiments, the originating device may be able to re-send the media even if the original message has been discarded.

In some embodiments, a 'message recall' communication may only be initiated from a destination device (e.g., device 240 in FIG. 2) if a user of the device requests or permits it. In these embodiments, the user may still be able to identify a nature or topic of the media from a thumbnail image that was received with the original chat message. If she is not interested in the media, she may refrain from approving or requesting recall of the full version of the media.

Figure 3:
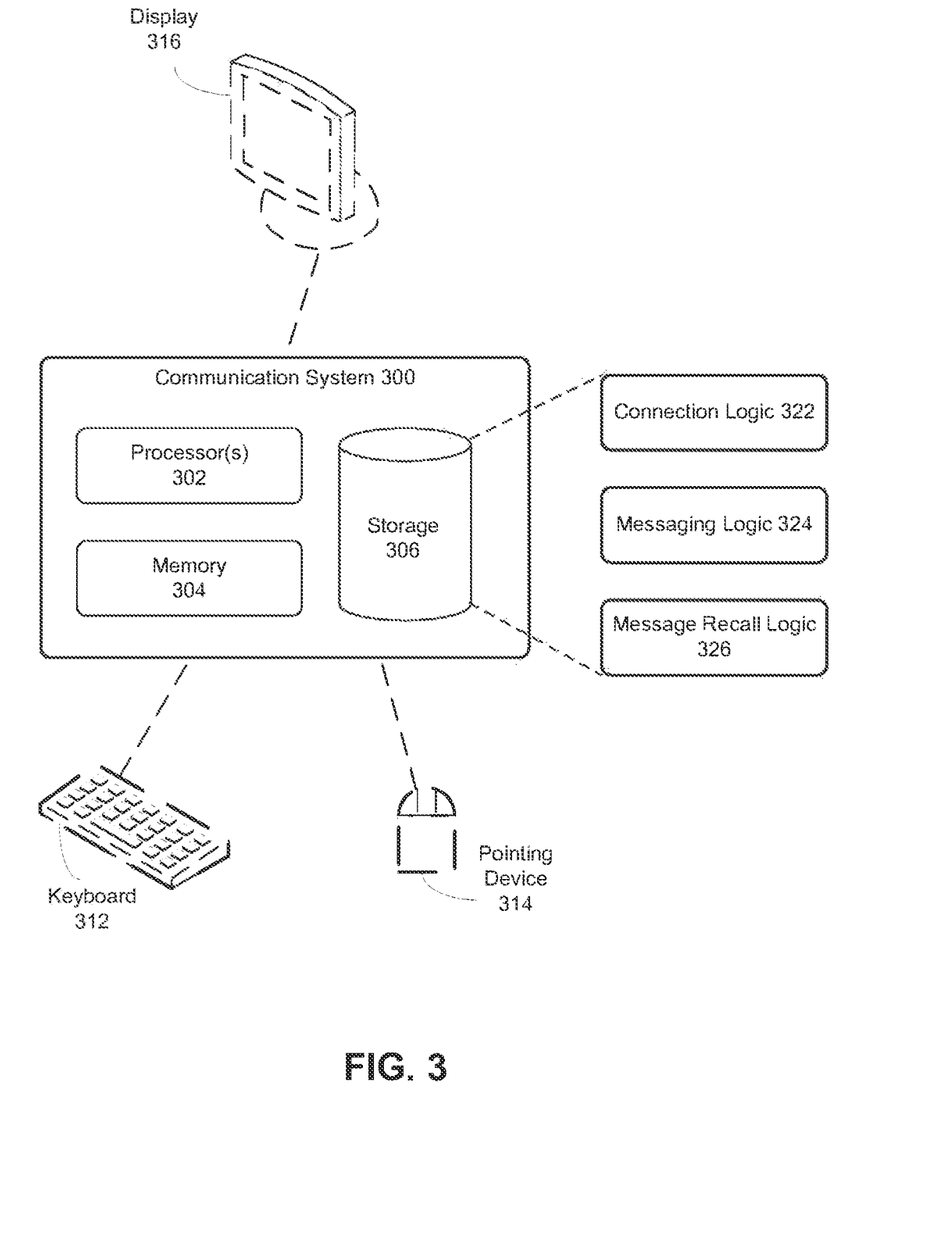
FIG. 3 depicts a communication server for facilitating automatic recall of a media message, in accordance with some embodiments of the invention.

FIG. 3 is a block diagram of a communication apparatus for supporting automated recall of a media communication message, according to some embodiments. It will be understood that in some alternative embodiments, communication apparatus 300 may comprise one or more communication servers, media servers, and/or other components that cooperate to host a communication application, support user connections and the exchange of messages between users, and the recall of media messages.

Communication apparatus of FIG. 3 comprises processor(s) 302, memory 304, and storage 306, which may comprise one or more optical and/or magnetic storage components. Apparatus 300 may be coupled (permanently or temporarily) to keyboard 312, pointing device 314, and display 316. The communication apparatus may include other components omitted in the interest of clarity, such as communication modules for communicating via wired and/or wireless communication links, interface components for interfacing with other external devices such as storage devices, a proxy server, a router, a load balancer, web servers, other system servers, etc.

Storage 306 of the apparatus stores logic that may be loaded into memory 304 for execution by processor(s) 302. Such logic includes connection logic 322, messaging logic 324, and message recall logic 326. Memory 304 and/or storage 306 may also store various data generated or used by apparatus 300, such as device parameters, media files, chat text awaiting delivery, media thumbnails, and so on.

Connection logic 322 comprises processor-executable instructions for receiving and managing connections with devices operated by users of a communication application hosted by apparatus 300. These instructions may allow the apparatus to identify connection requests, apply the correct protocol(s) to establish/maintain connections, terminate connections, exchange protocol messages that support the application, etc.

Messaging logic 324 comprises processor-executable instructions for receiving, storing, and forwarding/delivering messages exchanged between users of the communication application. Logic 324 may therefore ensure new messages are received correctly from originating devices, transform or re-format them as necessary (e.g., for different device platforms), and transmit them to destination users' devices.

Message recall logic 326 comprises processor-executable instructions for supporting (automatic) recall of a previous message, or at least media that accompanied the previous message. The message recall logic may ensure proper receipt of an automatic message recall from a destination device, may verify that the accompanying media could not be delivered, may ensure a recall request is delivered to an originating device (or a device of another recipient of the previous message), may return a failure message from the originating device, etc.

In some embodiments, any or all of connection logic 322, messaging logic 324, and message recall logic 326 are merged; in other embodiments they are further subdivided.

An environment in which some embodiments are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computer-implemented method comprising:
receiving a request for a media file from a first destination device of a plurality of destination devices participating in a group messaging interaction with an originating device, the request comprising an identifier of the media file;
determining that the media file is unable to be delivered to the first destination device;
sending a recall request to a second destination device of the plurality of destination devices;
receiving a new identifier for the media file or the media file from the second destination device; and
delivering the new identifier for the media file or the media file to the first destination device.

2. The computer-implemented method of claim 1, wherein the recall request is further sent to the originating device, wherein the group messaging interaction is provided by a messaging application, wherein the originating device initially transmitted the media file within the group messaging interaction.

3. The computer-implemented method of claim 1, wherein the recall request is further sent to the remaining plurality of destination devices, wherein the recall request is not sent to the originating device.

4. The computer-implemented method of claim 3, wherein the recall request is sent serially to the remaining plurality of destination devices until the new identifier or the media file is received from another destination device of the plurality of destination devices other than the first destination device.

5. The computer-implemented method of claim 3, wherein the recall request is sent in parallel to the plurality of destination devices other than the first destination device.

6. The computer-implemented method of claim 1, further comprising:
determining that the first destination device was the only destination device of the plurality of destination devices that failed to receive the media file; and
delivering the new identifier or the media file to the first destination device.

7. The computer-implemented method of claim 1, further comprising:
determining that one or more of the plurality of destination devices other than the first destination device failed to receive the media file; and
delivering the new identifier or the media file to each of the plurality of destination devices.

8. The computer-implemented method of claim 1, further comprising:
transmitting an error message to the first destination device based on the determination that the media file is unable to be delivered to the first destination device; and
receiving the recall request from the first destination device prior to transmitting the recall request.

9. An apparatus comprising:
a processor; and
a communication application executing on the processor and configured to:
receive a request for a media file from a first destination device of a plurality of destination devices participating in a group messaging interaction with an originating device, the request comprising an identifier of the media file;
determine that the media file is unable to be delivered to the first destination device;
send a recall request to a second destination device of the plurality of destination devices;
receive a new identifier for the media file or the media file from the second destination device; and
deliver the new identifier for the media file or the media file to the first destination device.

10. The apparatus of claim 9, wherein the recall request is further sent to the originating device, wherein the group messaging interaction is provided by a messaging application, wherein the originating device initially transmitted the media file within the group messaging interaction.

11. The apparatus of claim 9, wherein the recall request is further sent to the remaining plurality of destination devices, wherein the recall request is not sent to the originating device.

12. The apparatus of claim 11, wherein the recall request is sent serially to the remaining plurality of destination devices until the new identifier or the media file is received from another destination device of the plurality of destination devices other than the first destination device.

13. The apparatus of claim 11, wherein the recall request is sent in parallel to the plurality of destination devices other than the first destination device.

14. The apparatus of claim 9, wherein the communication application is further configured to:
determine that the first destination device was the only destination device of the plurality of destination devices that failed to receive the media file; and
deliver the new identifier or the media file to the first destination device.

15. The apparatus of claim 9, wherein the communication application is further configured to:
determine that one or more of the plurality of destination devices other than the first destination device failed to receive the media file; and
deliver the new identifier or the media file each of the plurality of destination devices.

16. A non-transitory computer-readable storage medium comprising instructions that, when executed by a processor, cause a system to:
receive a request for a media file from a first destination device of a plurality of destination devices participating in a group messaging interaction with an originating device, the request comprising an identifier of the media file;
determine that the media file is unavailable for delivery to the first destination device;
send a recall request to a second destination device of the plurality of destination devices;
receive a new identifier for the media file or the media file from the second destination device; and
deliver the new identifier for the media file or the media file to the first destination device.

17. The computer-readable storage medium of claim 16, wherein the recall request is further sent to the originating device, wherein the group messaging interaction is provided by a messaging application, wherein the originating device initially transmitted the media file within the group messaging interaction.

18. The computer-readable storage medium of claim 16, wherein the recall request is further sent to the remaining plurality of destination devices, wherein the recall request is not sent to the originating device.

19. The computer-readable storage medium of claim 16, comprising further instructions that cause the system to:
   determine that the first destination device was the only destination device of the plurality of destination devices that failed to receive the media file; and
   deliver the new identifier or the media file to the first destination device.

20. The computer-readable storage medium of claim 16, comprising further instructions that cause the system to:
   determine that one or more of the plurality of destination devices other than the first destination device failed to receive the media file; and
   deliver the new identifier or the media file to each of the plurality of destination devices.

\* \* \* \* \*